United States Patent
Hanover

(10) Patent No.: US 11,265,457 B2
(45) Date of Patent: *Mar. 1, 2022

(54) EYEWEAR DEVICE INPUT MECHANISM

(71) Applicant: Snap Inc., Santa Monica, CA (US)

(72) Inventor: Matthew Hanover, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,781

(22) Filed: Mar. 12, 2020

(65) Prior Publication Data

US 2020/0280673 A1 Sep. 3, 2020

Related U.S. Application Data

(63) Continuation of application No. 15/717,663, filed on Sep. 27, 2017, now Pat. No. 10,623,628.
(Continued)

(51) Int. Cl.
*H04N 5/232* (2006.01)
*G03B 17/56* (2021.01)
(Continued)

(52) U.S. Cl.
CPC ......... *H04N 5/23216* (2013.01); *G02C 11/04* (2013.01); *G02C 11/10* (2013.01); *G03B 17/48* (2013.01); *G03B 17/56* (2013.01); *G06F 3/0346* (2013.01); *H04N 5/2253* (2013.01); *H04N 5/2256* (2013.01); *H04N 5/2257* (2013.01); *H04N 5/23245* (2013.01)

(58) Field of Classification Search
CPC .. H04N 5/2253; H04N 5/2256; H04N 5/2257; H04N 5/23216; H04N 5/23245; G06F 3/0346; G03B 17/48; G03B 17/56; G02C 11/04; G02C 11/10
USPC ................ 345/8, 156; 351/55, 158; 348/734
See application file for complete search history.

(56) References Cited

U.S. PATENT DOCUMENTS

| 6,038,295 A | 3/2000 | Mattes |
| 6,084,557 A | 7/2000 | Ishida et al. |
| (Continued) |

FOREIGN PATENT DOCUMENTS

| CA | 2887596 A1 | 7/2015 |
| CN | 101819334 | 9/2010 |
| (Continued) |

OTHER PUBLICATIONS

U.S. Appl. No. 15/717,637, U.S. Pat. No. 10,708,488, filed Sep. 27, 2017, Eyewear Device Mode Indication.
(Continued)

*Primary Examiner* — Prabodh M Dharia
(74) *Attorney, Agent, or Firm* — Schwegman Lundberg & Woessner, P.A.

(57) ABSTRACT

An electronics-enabled eyewear device provides a primary command channel and a secondary command channel for receiving user input during untethered wear, one of the command channels providing for tap input detected by motion sensor(s) incorporated in a body of the eyewear device. A predefined tap sequence or pattern can be applied to frame of the device to trigger as device function. In one example, a double tap of the device's frame causes charge level display indicating a battery charge level.

19 Claims, 9 Drawing Sheets

Related U.S. Application Data

(60) Provisional application No. 62/400,241, filed on Sep. 27, 2016.

(51) Int. Cl.
  *G03B 17/48* (2021.01)
  *G02C 11/04* (2006.01)
  *H04N 5/225* (2006.01)
  *G02C 11/00* (2006.01)
  *G06F 3/0346* (2013.01)

(56) References Cited

U.S. PATENT DOCUMENTS

| | | |
|---|---|---|
| 6,712,471 B1 | 3/2004 | Travis et al. |
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,830,071 B1 | 11/2017 | Patel et al. |
| 10,623,628 B2 | 4/2020 | Hanover |
| 10,708,488 B2 | 7/2020 | Hanover |
| 2001/0038491 A1 | 11/2001 | Fergason |
| 2002/0027548 A1 | 3/2002 | Yoneno |
| 2006/0262194 A1 | 11/2006 | Swain |
| 2007/0046887 A1 | 3/2007 | Howell et al. |
| 2007/0183152 A1 | 8/2007 | Hauck et al. |
| 2008/0192114 A1 | 8/2008 | Pearson et al. |
| 2008/0199829 A1 | 8/2008 | Paley et al. |
| 2010/0045928 A1 | 2/2010 | Levy |
| 2010/0180298 A1 | 7/2010 | Kim et al. |
| 2010/0201615 A1* | 8/2010 | Tupman .......... G06F 1/1626 345/156 |
| 2010/0309535 A1 | 12/2010 | Landowski et al. |
| 2011/0063521 A1 | 3/2011 | Karaoguz et al. |
| 2011/0202598 A1 | 8/2011 | Evans et al. |
| 2012/0068921 A1 | 3/2012 | Jacobsen et al. |
| 2012/0081294 A1 | 4/2012 | Dinh et al. |
| 2012/0147316 A1* | 6/2012 | Loeb, Jr .......... G02C 5/124 351/55 |
| 2012/0200695 A1 | 8/2012 | Yamane et al. |
| 2012/0209924 A1 | 8/2012 | Evans et al. |
| 2012/0294478 A1 | 11/2012 | Publicover et al. |
| 2013/0097038 A1 | 4/2013 | Potter et al. |
| 2013/0214998 A1* | 8/2013 | Andes .......... G06F 3/0346 345/8 |
| 2013/0265507 A1 | 10/2013 | Ford et al. |
| 2014/0152316 A1 | 6/2014 | Stanek et al. |
| 2014/0160424 A1 | 6/2014 | Benko et al. |
| 2014/0256431 A1 | 9/2014 | Pope et al. |
| 2014/0347265 A1 | 11/2014 | Aimone et al. |
| 2015/0078757 A1 | 3/2015 | Pederson |
| 2015/0094914 A1 | 4/2015 | Abreu |
| 2015/0169050 A1 | 6/2015 | Publicover et al. |
| 2015/0024491 A1 | 8/2015 | Marston et al. |
| 2015/0244848 A1 | 8/2015 | Park et al. |
| 2015/0331576 A1 | 11/2015 | Piya et al. |
| 2015/0362759 A1 | 12/2015 | Verkaik et al. |
| 2015/0370765 A1 | 12/2015 | Kim et al. |
| 2016/0012465 A1 | 1/2016 | Sharp |
| 2016/0054802 A1 | 2/2016 | Dickerson et al. |
| 2016/0116988 A1* | 4/2016 | Priyantha .......... G06F 1/3259 345/156 |
| 2016/0283081 A1 | 9/2016 | Johnston et al. |
| 2016/0357304 A1 | 12/2016 | Hatori et al. |
| 2017/0017085 A1 | 1/2017 | Araki et al. |
| 2017/0046062 A1* | 2/2017 | Lee .......... G06F 3/0488 |
| 2017/0108715 A1 | 4/2017 | Bauer |
| 2017/0116476 A1 | 4/2017 | Publicover et al. |
| 2017/0216720 A1 | 8/2017 | Colenbrander |
| 2017/0242497 A1 | 8/2017 | Andes et al. |
| 2017/0285941 A1 | 10/2017 | Nale et al. |
| 2017/0308166 A1 | 10/2017 | Mallinson |
| 2017/0324437 A1 | 11/2017 | Ruttier et al. |
| 2018/0011545 A1 | 1/2018 | Stafford et al. |
| 2018/0070166 A1* | 3/2018 | Howell .......... H04R 1/1016 |
| 2018/0088687 A1* | 3/2018 | Hanover .......... H04N 5/2253 |
| 2018/0091729 A1 | 3/2018 | Hanover |
| 2018/0101240 A1 | 4/2018 | Carceroni et al. |
| 2018/0103432 A1* | 4/2018 | Ludwig .......... H04W 52/0254 |
| 2018/0107025 A1 | 4/2018 | Smit et al. |
| 2018/0227800 A1 | 8/2018 | Wang |
| 2019/0070498 A1 | 3/2019 | Perry |
| 2019/0108645 A1 | 4/2019 | Ben-Yishai |
| 2020/0077892 A1* | 3/2020 | Tran .......... G08B 25/016 |
| 2020/0201491 A1* | 6/2020 | Coffman .......... G06F 3/0488 |
| 2021/0014407 A1 | 1/2021 | Hanover |

FOREIGN PATENT DOCUMENTS

| | | |
|---|---|---|
| CN | 102033329 | 4/2011 |
| CN | 103885206 | 6/2014 |
| CN | 103885206 B | 6/2015 |
| CN | 104969118 | 10/2015 |
| CN | 109791346 A | 5/2019 |
| CN | 109791346 B | 4/2021 |
| EP | 3519892 B1 | 12/2020 |
| JP | 2016048566 | 4/2016 |
| KR | 102240087 B1 | 4/2021 |
| WO | WO-2018064195 A1 | 4/2018 |

OTHER PUBLICATIONS

U.S. Appl. No. 15/717,663, U.S. Pat. No. 10,623,628, filed Sep. 27, 2017, Eyewear Device Input Mechanism.

U.S. Appl. No. 16/883,665, filed May 26, 2020, Eyewear Device Mode Indication.

"U.S. Appl. No. 15/717,637, Final Office Action dated Jan. 30, 2020", 8 pgs.

"U.S. Appl. No. 15/717,637, Non Final Office Action dated Mar. 1, 2019", 23 pgs.

"U.S. Appl. No. 15/717,637, Non Final Office Action dated Aug. 8, 2019", 27 pgs.

"U.S. Appl. No. 15/717,637, Notice of Allowance dated Feb. 19, 2020", 9 pgs.

"U.S. Appl. No. 15/717,637, Response filed Jan. 31, 2020 to Final Office Action dated Jan. 30, 2020", 7 pgs.

"U.S. Appl. No. 15/717,637, Response filed Jul. 1, 2019 to Non-Final Office Action dated Mar. 1, 2019", 11 pgs.

"U.S. Appl. No. 15/717,637, Response filed Dec. 9, 2019 to Non Final Office Action dated Aug. 8, 2019", 9 pgs.

"U.S. Appl. No. 15/717,663, Final Office Action dated May 22, 2019", 25 pgs.

"U.S. Appl. No. 15/717,663, Non Final Office Action dated Dec. 5, 2018", 22 pgs.

"U.S. Appl. No. 15/717,663, Notice of Allowance dated Dec. 5, 2019", 24 pgs.

"U.S. Appl. No. 15/717,663, Response filed Sep. 23, 2019 to Final Office Action dated May 22, 2019", 9 pgs.

"U.S. Appl. No. 15/717,663, Response filed Mar. 27, 2019 to Non Final Office Action dated Dec. 5, 2018", 9 pgs.

"European Application Serial No. 17781600.6, Communication Pursuant to Article 94(3) EPC Oct. 1, 2019", 4 pgs.

(56) References Cited

OTHER PUBLICATIONS

"European Application Serial No. 17781600.6, Response filed Feb. 3, 2020 to Communication Pursuant to Article 94(3) EPC Oct. 1, 2019", 22 pgs.

"International Application Serial No. PCT/US2017/053774, International Preliminary Report on Patentability dated Apr. 11, 2019", 7 pgs.

"International Application Serial No. PCT/US2017/053774, International Search Report dated Nov. 28, 2017", 4 pgs.

"International Application Serial No. PCT/US2017/053774, Written Opinion dated Nov. 28, 2017", 5 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

"Korean Application Serial No. 10-2019-7012070, Notice of Preliminary Rejection dated Sep. 9, 2020", w/ English Translation, 11 pgs.

"Chinese Application Serial No. 201780059265.0, Office Action dated Sep. 1, 2020", w/ English Translation, 11 pgs.

"U.S. Appl. No. 16/883,665, Preliminary Amendment filed Oct. 22, 2020", 6 pgs.

"Korean Application Serial No. 10-2019-7012070, Response filed Nov. 9, 2020 to Notice of Preliminary Rejection dated Sep. 9, 2020", w/ English Claims, 15 pgs.

"Korean Application Serial No. 10-2019-7012070, Notice of Preliminary Rejection dated Nov. 16, 2020", w/ English Translation, 4 pgs.

"U.S. Appl. No. 16/883,665, Non Final Office Action dated May 19, 2021", 41 pgs.

"Chinese Application Serial No. 201780059265.0, Response filed Jan. 18, 2021 to Office Action dated Sep. 1, 2020", w/ English Claims, 12 pgs.

"Korean Application Serial No. 10-2019-7012070, Response filed Jan. 15, 2021 to Notice of Preliminary Rejection dated Nov. 16, 2020", w/ English Claims, 9 pgs.

\* cited by examiner

EYEWEAR DEVICE INPUT MECHANISM

CLAIM OF PRIORITY

This application is a continuation of U.S. patent application Ser. No. 15/717,663, filed on Sep. 27, 2017, which claims the benefit of priority to U.S. Provisional Application Ser. No. 62/400,241, filed on Sep. 27, 2016, each of which is hereby incorporated by reference herein in their entireties.

BACKGROUND

Electronics-enabled eyewear devices, such as so-called smart glasses, are often configured for operation with limited or no graphical user interfaces. This applies particularly to untethered wear. Owing to space and weight limitations, control and feedback mechanisms are at a premium.

BRIEF DESCRIPTION OF THE DRAWINGS

Various ones of the appended drawings illustrate merely example embodiments of the present disclosure and should not be considered as limiting its scope. In the drawings:

FIG. 2A illustrates a video capture mode display;
FIG. 2B illustrates a photo capture mode display; and
FIG. 2C illustrates a battery charge level display.

DESCRIPTION

Figure 1:
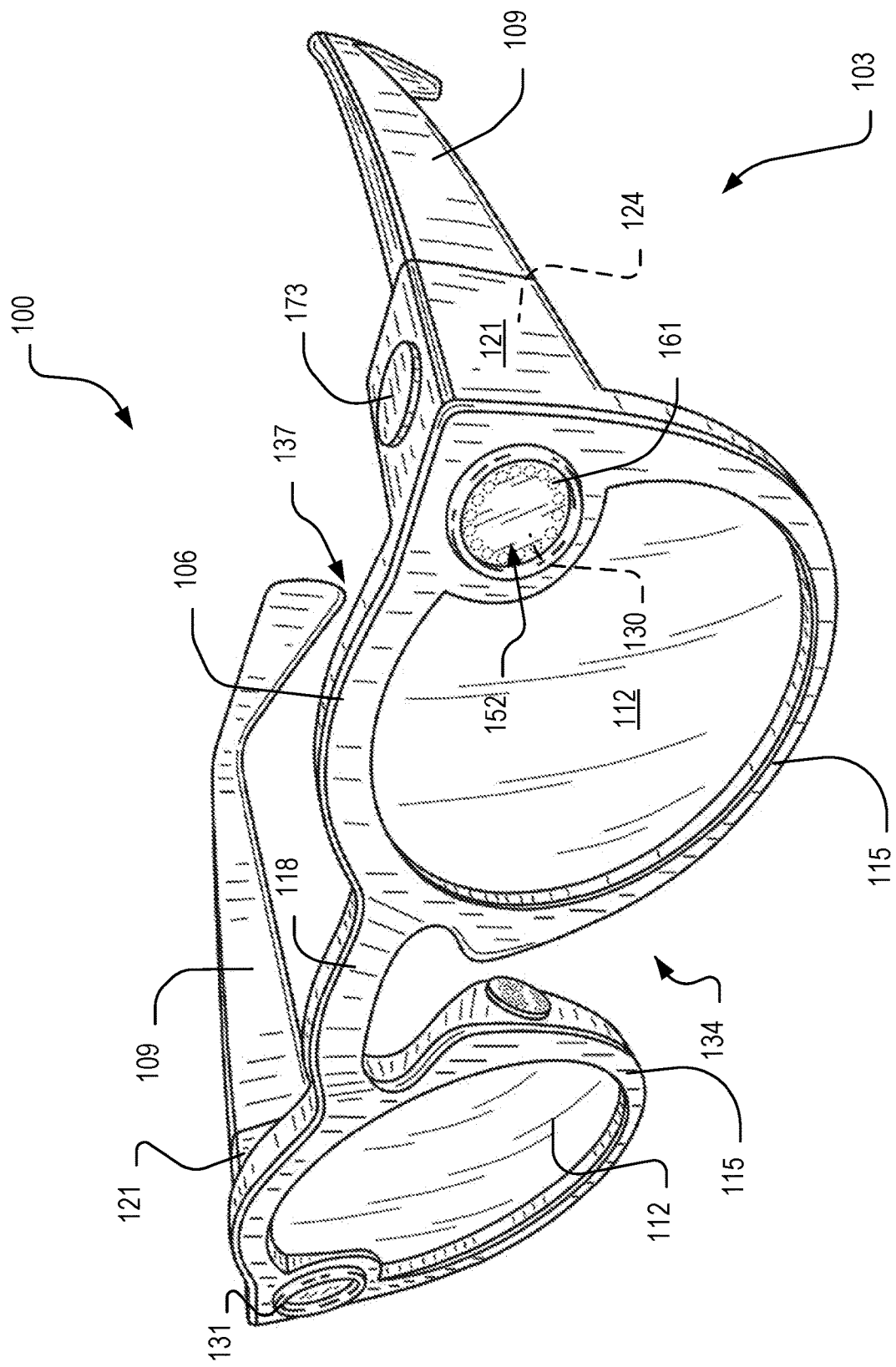
FIG. 1 is a three-dimensional view of a camera-enabled eyewear device in the form of a pair of smart glasses, according to an example embodiment.

The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

One of the disclosure comprises provision of a plurality of parallel command channels for controlling operation of an electronics-enabled eyewear device during untethered use, at least one of the command channels providing for input by tapping the eyewear device. This aspect of the disclosure in some embodiments provides an eyewear device comprising:

an eyewear body configured for wearing by users such as the support one or more optical elements (e.g., optical or sunglass lenses) held by the body within view of the user;

onboard electronics incorporated in the eyewear body;

a primary input mechanism incorporated in the eyewear body and configured to provide a primary command channel to receive user inputs for controlling one or more functionalities of the onboard electronics during untethered wear of the eyewear device, and a secondary input mechanism incorporated in the eyewear body and configured to provide a secondary command channel to receive user inputs for controlling one or more functionalities of the onboard electronics during untethered wear thereof, the secondary command channel using a different mode of user input than the primary command channel, wherein one of the primary and secondary input mechanisms is a tap input mechanism configured to receive tap input, the tap input mechanism comprising a motion sensor incorporated in the eyewear body.

Note that designation of the respective communications channel as primary and secondary does not necessarily mean that the primary communications channel is of greater importance, has a greater variety of available user commands, or control more important device functions than the secondary command channel, although this is in some embodiments the case, as will be seen from the description that follows.

The motion sensor may comprise one or more accelerometers, in a particular example embodiment comprising an array of accelerometers configured to detect multi-directional acceleration of the eyewear body. The tap input mechanism can thus in some embodiments provide for an accelerometric command channel. In some embodiments, the eyewear body comprises an eyewear frame holding the one or more optical elements, and a pair of temples displaceably mounted at opposite lateral ends of the frame for supporting the frame during wear, the accelerometers being housed in the frame.

The tap input mechanism may comprise a motion data processor comprising circuitry configured to process motion data captured by the motion sensor to identify from the motion data a tap command communicated from the user to the eyewear device by imparting tap motion to the eyewear body. The circuitry of the motion data processor may some embodiments be provided by a computer processor executing machine-readable instructions. In other embodiments, the circuitry of the motion data processor may be provided by permanently configured circuitry, such as an application specific integrated circuit. The motion data processor is in some embodiments configured to distinguish between tap commands and incidental motion reflected in the motion data based on predefined identification criteria. This is to avoid accidental registering of a user command due to motion of the eyewear device during use, without any user input actually having been provided.

The identification criteria define may define a predefined tap sequence to register a corresponding user command. In one example embodiment, the predefined tap sequence comprises a double-tap command. The motion data processor is in some such embodiments configured to identify occurrence of the double-tap command represented in the motion data by operations comprising: identifying two sequential tap events; determining an interval between the two tap events; and registering the two tap events as a double-tap command conditional upon the interval being smaller than a predefined threshold period.

It will be appreciated that a number of tap sequence different from or in addition to a double-tap may in some embodiments be provided to trigger corresponding commands. The identification criteria may in some embodiments define a plurality of different tap sequences corresponding to a plurality of different user commands. In one embodiment, for example, a double tap causes display of a charge level indication (as will be discussed below), while a triple-tap input can be used to control a camera function of the device, e.g., to trigger video capture, change camera mode, or the like.

In some embodiments, both the primary and the secondary command channels are manual command channels in which user inputs are imparted by manual interaction with the eyewear body. This is to say that the command channel other than the tap command channel is operated by manual user interaction with the eyewear device, the tap input channel being considered a manual input channel by virtue of the fact that tap inputs are expected predominantly to be applied manually. In some embodiments, the primary input channel is provided by a button input mechanism comprising a button mounted on the eyewear body for manual user operation.

In some embodiments, the secondary command channel, provided by the tap mechanism, provides fewer user commands than the primary command channel. In one embodiment, the secondary input mechanism provides for recognition and execution of no more than a single user command. In such an embodiment, the single command of the secondary command channel provided by the tap input mechanism triggers display of a charge level indication via a visual indicator incorporated in the eyewear body, the charge level indication showing a level of charge of an onboard battery of the eyewear device. In some such embodiments, the single user, and provided by the tap mechanism is a toggle command, switching a device function on or off depending on the current mode of the function. The toggle command in some embodiments serves to toggle charge level indication via the visual indicator. Note that such a toggle command is considered a single command as used herein, even though provision of the command in different instances can trigger charge level display (if no display is current), or cessation of charge level display (if display is current).

In some embodiments, the visual indicator comprises a series of light emitters mounted on an exterior surface of the eyewear body, the charge level being indicated by illuminating a proportion of the series of light emitters corresponding broadly to the level of battery charge. In one embodiment, the visual indicator includes a ring of light emitting diodes (LEDs) arranged peripherally around a camera lens or a camera analog formation provided by the eyewear body. With camera analog is meant a formation on the eyewear frame that has the external shape and appearance of a camera lens, without in fact having an associated camera device. As will be described in greater detail in the description that follows, the indicator may in some embodiments provide display modes corresponding to further operational modes of the camera and/or the eyewear device, including but not limited to respective modes for indicating: photo capture, battery charge level, device pairing status, and system events (e.g., system crashes).

Another aspect of the disclosure provides a method comprising:

during wear of an eyewear device by a user, receiving user input via a primary input mechanism incorporated in an eyewear body of the eyewear device to provide a primary command channel; and during wear of the eyewear device, receiving user input via a secondary input mechanism incorporated in the eyewear body to provide a secondary command channel, the secondary command channel using a different mode of user input than the primary command channel, wherein one of the primary and secondary input mechanisms is a tap input mechanism configured to receive tap input, the tap input mechanism comprising a motion sensor incorporated in the eyewear body.

DESCRIPTION OF EXAMPLE EMBODIMENT

FIG. 1 shows a front perspective view of an eyewear device in the form of a pair of smart glasses 100 according to one example embodiment. The glasses 100 include a body 103 comprising a front piece or frame 106 and a pair of temples 109 connected to the frame 106 for supporting the frame 106 in position on a user's face when the glasses 100 are worn. The frame 106 can be made from any suitable material such as plastics or metal, including any suitable shape memory alloy.

The glasses 100 include a pair of optical elements in the form of a pair of lenses 112 held by corresponding optical element holders in the form of a pair of rims 115 forming part of the frame 106. The rims 115 are connected by a bridge 118. In other embodiments, of one or both of the optical elements can be a display (for example providing a virtual reality display), a display assembly, or a lens and display combination (e.g., to provide an augmented reality display or information overlay over an ambient view).

In this description, directional terms such as front, back, forwards, rearwards, outwards and inwards are to be understood with reference to a direction of view of a user when the glasses 100 are worn. Thus, the frame 106 has a front or outwardly directed side 134 facing away from the user when worn, and an opposite rear or inwardly directed side facing towards the user when the glasses 100 are worn.

The frame 106 includes a pair of end pieces 121 defining lateral end portions of the frame 106. In this example, on-board electronics 124 comprising a variety of electronics electronic components are housed in one or both of the end pieces 121, as discussed in more detail below. In some embodiments, the frame 106 is formed of a single piece of material, so as to have a unitary or monolithic construction. In some embodiments, the whole of the body 103 (including both the frame 106 and the temples 109) can be of the unitary or monolithic construction.

The temples 109 are coupled to the respective end pieces 121. In this example, the temples 109 are coupled to the frame 106 by respective hinges so as to be hingedly movable between a wearable mode (as shown in FIG. 1) and a collapsed mode in which the temples 109 are pivoted towards the frame 106 to lie substantially flat against it. The glasses 100 in the collapsed mode presents one or more charging formations on its exterior for engagement with a charging device to allow charging of an on-board battery forming part of the onboard electronics 124. Such charging devices can include charging cables connectable to an external power supply, and a carry case in which the glasses 100 can be docked such as to be charged by a charging battery carried by the carry case.

The onboard electronics 124 including a computing device, such as a computer, which can in different embodiments be of any suitable type so as to be carried by the body 103. In some embodiments, various components of the onboard electronics 124 are at least partially housed in one or both of the temples 109. The onboard electronics 124 includes one or more processors with memory, wireless communication circuitry, and a power source (this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways.

As mentioned, the onboard electronics 124 includes a rechargeable battery. In some embodiments, the battery is disposed in one of the temples 109. In this example embodiment, however, the battery is housed in one of the end pieces 121, being electrically coupled to the remainder of the onboard electronics 124.

The pair of glasses 100 is camera-enabled, in this example comprising a camera 130 mounted in one of the end pieces 121 and facing forwards so as to be aligned more or less with the direction of view of a wearer of the glasses 100. The camera 130 is configured to capture digital photographs as well as digital video content. Operation of the camera 130 is controlled by a camera controller provided by the onboard electronics 124, image data representative of images or video captured by the camera 130 being temporarily stored on a memory forming part of the onboard electronics 124.

In some embodiments, the glasses 100 can have a pair of cameras 130, e.g. housed by the respective end pieces 121. In this embodiment, however, the glasses 100 has only the single camera 130 housed in the left-sided end piece 121 (when viewed from the orientation of a user during wearing thereof). An externally identical camera analog formation 131 is, however, symmetrically provided on the right-hand side end piece 121. As used herein, a camera analog or pseudo-camera formation means a formation on the eyewear frame that has the appearance of a camera lens opening and/or housing, but which does not in fact have a functional camera associated therewith. As will be described below, the camera 130 and its associated lens opening 152 in this example embodiment has a mode indicator 161 located in association therewith. In other embodiments, however, the mode indicator 161 may be provided in association with the camera analog formation 131, with the actual camera 130 having no co-located mode indicator. In one such embodiment, for example, a solitary camera 130 is located in the left-sided end piece 121, with a solitary mode indicator 161 being provided in the camera analog formation 131 of the right-sided end piece 121. A benefit of such an arrangement is that there is substantially no possibility of adverse effect of light emissions by the mode indicator during use on image-capturing functionalities of the camera 130. In yet a further embodiment, each of the end pieces 121 has a respective camera 130 and an associated co-located mode indicator 161. In another embodiment, the glasses 100 may have two cameras integrated at opposite ends of the frame 106, with a single mode indicator 161 provided in association with only one of the cameras 130.

Returning now to the example embodiment of FIG. 1, it will be understood that a lens of the camera 130 in conventional fashion faces forwards and is for protective purposes located behind a transparent covering. As can be seen in FIG. 1, a camera housing formation defined by the frame 106 and in which the camera is housed also houses the mode indicator 161, in this example embodiment consisting of a ring of LEDs 207 (see also FIG. 2A) extending circumferentially around the camera lens opening 152. In this example embodiment, the ring of LEDs 207 is located behind the transparent camera cover. In other embodiments, the LED ring can be located outside of the housing, on the exterior of the frame.

In this example embodiment, the LEDs 207 of the mode indicator 161 is thus hidden and substantially obscure when they are switched off, but become visible when powered to emit light. In the drawings, any LED 207 indicated in broken lines are to be understood as being switched off; LEDs 207 are shown to be shining by being depicted in unbroken lines. Different example display modes of the mode indicator 161, corresponding to different respective modes of operation of the glasses 100 and/or the camera 130, will be described later herein with reference to FIGS. 2A-2C.

In addition to the externally visible mode indicator 161, the glasses 100 in some embodiments further include one or more user-oriented mode indicator mechanisms to indicate occurrence of one or more operational modes to a wearer of the glasses 100. In one such embodiment, an LED arrangement is mounted on the inner surface 137 of the frame 106 to be peripherally visible to the wearer when lit. Such an internal mode indicator may be continuously activated during video capture, and may flash simultaneously with photo capture. In this manner, the wearer is apprised of video or photo capture. It will be appreciated that such a user-oriented mode indication mechanism is to be distinguished from the external mode indicator 161 in that the external mode indicator 161 is sized and positioned specifically to alert persons other than the user of video and/or photo capture.

The glasses 100 further include one or more input and output mechanisms permitting communication with and control of the electronics 124. In particular, the glasses 100 include one or more input mechanisms for enabling user control of one or more functions of the camera 130. In this embodiment, a primary input mechanism comprises a button 173 mounted on the frame 106 so as to be accessible on top of one of the end pieces 121 for pressing by the user. In addition to any other functions that may be controlled by operation of the button 173, the button 173 in this example provides a camera trigger mechanism enabling the user to selectively trigger photo capture or video capture by the camera 130. In the current example embodiment, a photo capture command can be issued by a single, relatively short button press (e.g., shorter than a second), while a video capture command can be issued by a press-and-hold action.

For some functionalities of the LED ring mode indicator 161, control input from the user is not restricted to presses of the control button 173. A secondary command channel is provided by a tap input mechanism 319 (shown schematically in FIG. 3) that detects user commands in the form of a predefined sequence or pattern of taps applied by the user to the frame 106 of the glasses 100. Detect such that inputs, the Mechanism 319 includes a motion sensor 336 comprising a set of accelerometers incorporated in the eyewear frame 106. In this example embodiment, tap command channel provides a single user-selectable command by means of a double-tap.

The glasses 100 may include a variety of additional sensors. Such sensors can include inwardly-facing video sensors or digital imaging modules such as cameras that can be mounted on or provided within the inner surface 137 of the frame 106 so as to be facing the user, in addition to outwardly-facing video sensors or digital imaging modules such as the camera(s) 130 previously described. Such sensors, peripheral devices or peripherals can additionally include biometric sensors, location sensors, or any other such sensors.

Figure 2A:
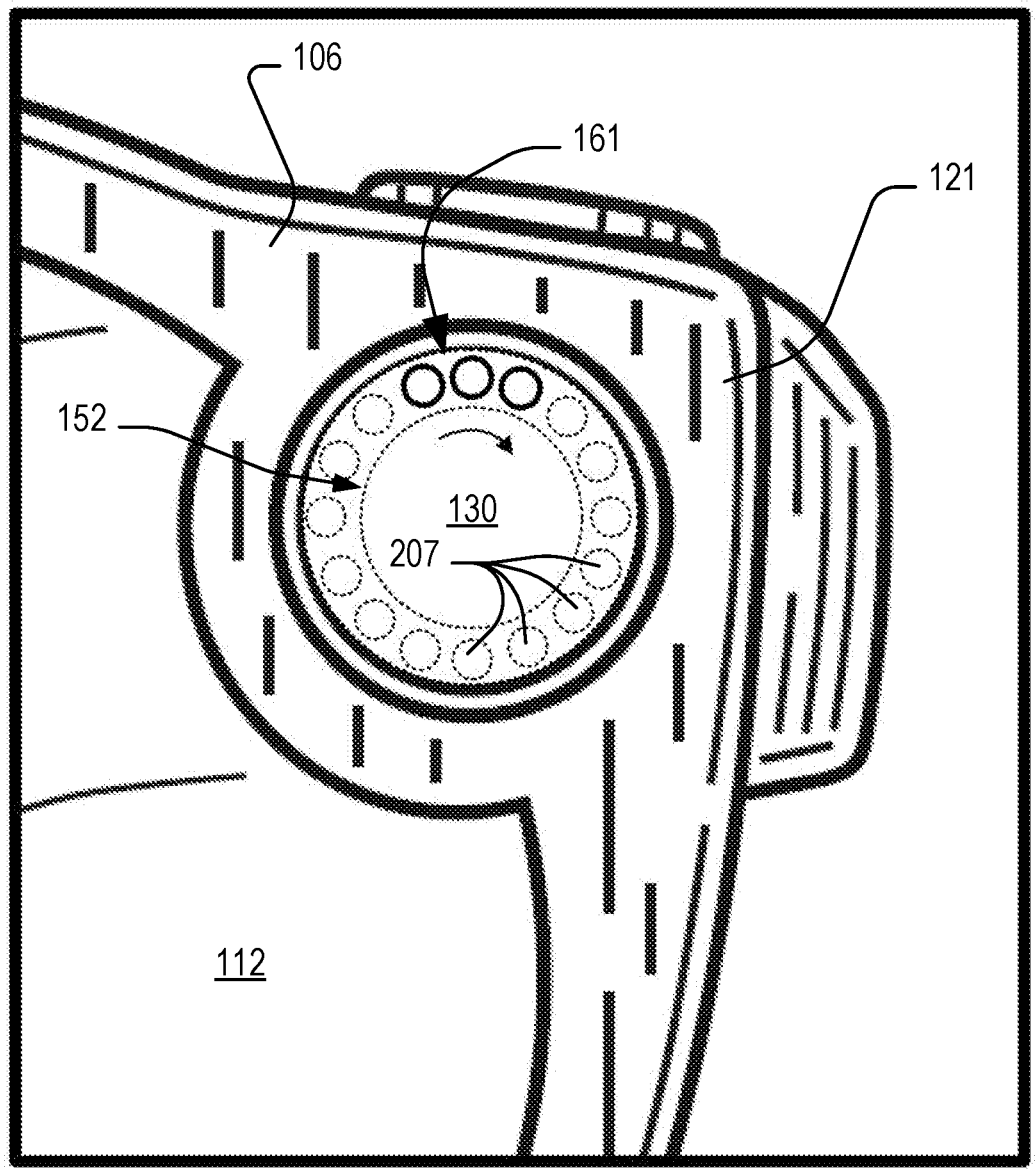
FIGS. 2A-2C are schematic views of a series of display modes of an LED ring mode indicator forming part of smart glasses corresponding to the example embodiment of FIG. 1. In particular.
Figure 2B:
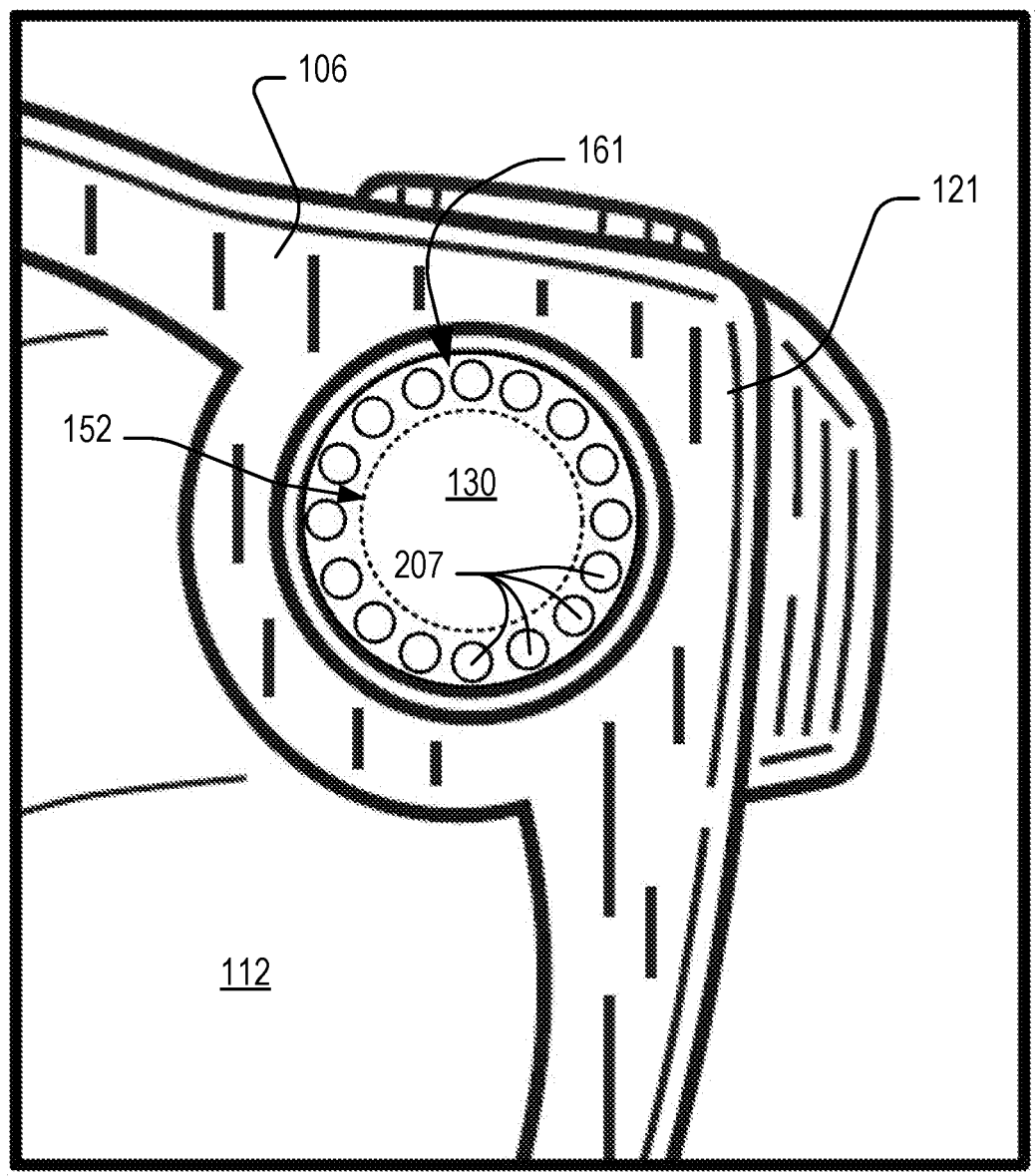
Figure 2C:
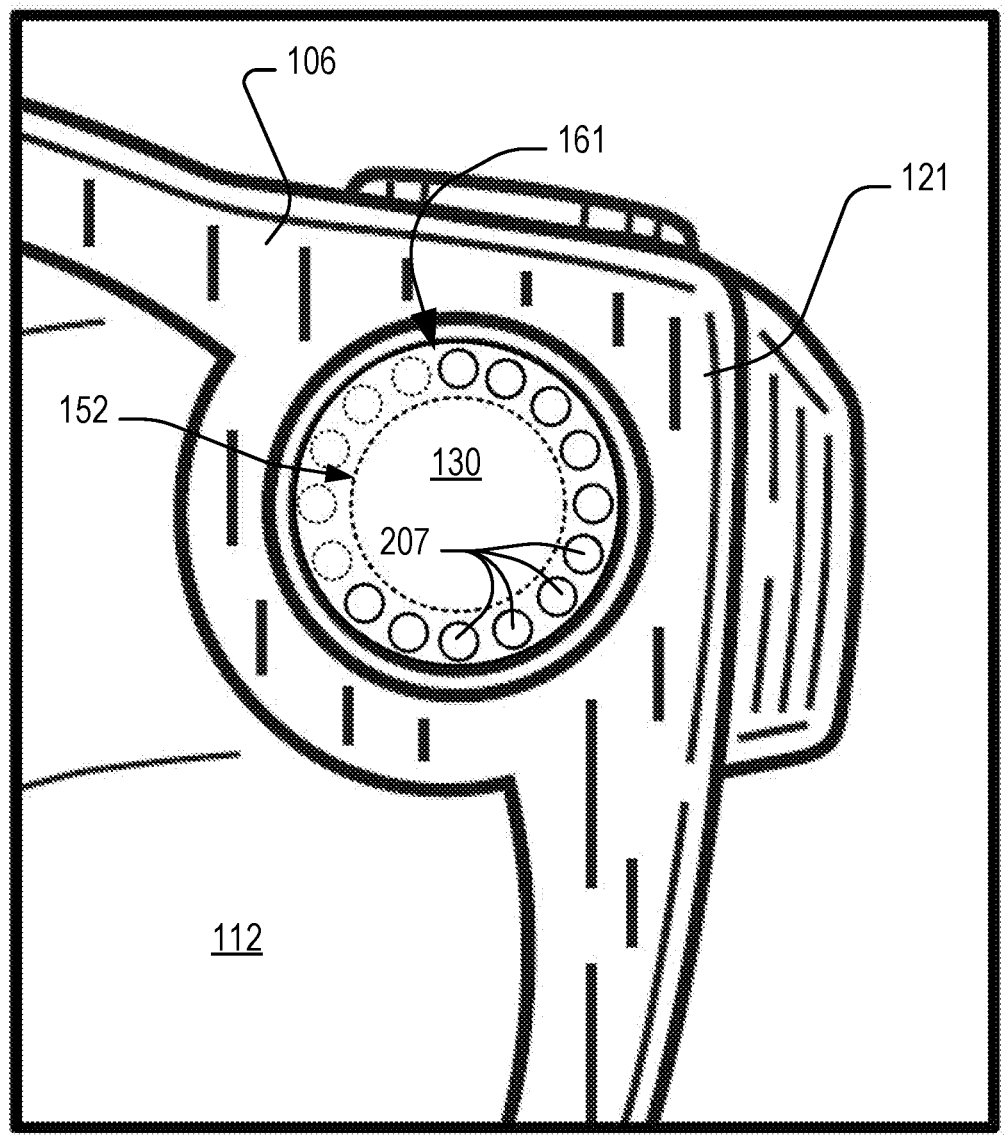

Turning now to the example visual mode indications of FIGS. 2A-2C, it will be seen that the mode indicator 161 in this example embodiment serves to display a plurality of different visual indications corresponding to a plurality of different operational modes of the camera 103 and/or the glasses 100. A first mode of indicator behavior in this example embodiment is illustrated in FIG. 2A, for indicating active video recording. The indication displayed by the LED mode indicator 161 in this instance comprises animated circular movement of activated LEDs 207 around the LED ring 161 (in the direction of the rotational arrow), creating the visual impression of a "comet tail" countdown. Note that this animated display is designed and positioned on the glasses 100 specifically to be highly visible, so as readily to indicate to persons within the vicinity of the smart glasses 100 that video content is being captured by the camera 103.

In some embodiments, the circulating video capture animation of FIG. 2A indicates not only that video is being recorded, but additionally indicates the time remaining for a predefined video clip length. In such case, for example, the animation may circulate once in a 10 second recording interval. In another embodiment, animated video capture indication may comprise a circulating countdown of illuminated LEDs 207. In one such embodiment, the full LED ring 161 is illuminated at the outset of the predefined recording period (e.g., 10 seconds), progressively being counted down to expiry of the recording period. In an alternative embodiment, the LED ring of the mode indicator 161 charges up towards completion.

A second example mode of operation indicated by the LED ring mode indicator 161 is illustrated with reference to FIG. 2B. This mode is for photo capture, and in this embodiment comprises a single flash or short-interval activation of the full ring of LEDs 207. Thus, when the user presses the button 173 to trigger photo capture, the mode indicator 161 displays a single full ring flash substantially simultaneously with the capturing of a photo by use of the eyewear device 100. Note that, distinct from flash lighting in conventional camera devices, the flashing of the mode indicator 161 is displayed regardless of ambient light conditions. As previously, the prominent placement of the mode indicator, its readily perceptible association with camera functionalities of the glasses 100, and the relatively high visibility of the photo capture indication, secretive photo capturing by a wearer of the glasses 100 is inhibited by operation of the mode indicator 161.

It is additionally to be noted that invariable display of both the video capture indication of FIG. 2A and the photo capture indication of FIG. 2B is systemically enforced and is non-optional, being unalterably produced by the mode indicator 161 at each instance of video capture or photo capture. The glasses 100 in other words provide no user-accessible option for deactivating or otherwise altering the video capture notification and/or the photo capture notification. Such non-customizability of mode indication serves to further trust by others that they are not being photographed or video-taped without their knowledge, thereby increasing the likelihood of wide-spread acceptance and the lessening of suspicion against wearers of camera-enabled eyewear devices.

Note that, in this example embodiment, the luminescence of the LEDs 207 is insufficient for the mode indicator 161 to serve the dual purpose of illumination for flash photography. In other embodiments, however, the LEDs 207 may be configured to provide flash illumination in addition to the mode indicator functionalities described herein. Such flash functionalities can be enhanced by providing a respective ring of LEDs 207 at each lateral end of the eyewear frame 106.

FIG. 2C schematically illustrates a further display mode of the indicator 161, in which not only an operational mode, but also an attribute value associated with camera operation is indicated. In the example of FIG. 2C, the operational mode indicated by the mode indicator 161 is a battery charging mode, with the ring of LEDs 207 additionally serving to indicate a current charging level of the onboard battery of the pair of glasses 100. As can be seen in FIG. 2C, battery charge level is indicated by illuminating a portion of the LED corresponding to a portion of battery charge remaining. Illumination of the full ring of LEDs 207 thus indicates a full charge, a half-lit display indicates 50% charge level, and so on. In some embodiments, a lesser proportion of the LED ring can be used to indicate a full charge.

In this example embodiment, battery charge level indication can be triggered by two different mechanisms, namely (1) by a charge checking operation, and (2) by charging of the onboard battery 391. As mentioned earlier, charge checking display can be triggered by means of a tap command channel that is responsive to user input via tapping of the eyewear frame 106 in one or more predefined sequences. In particular, a rapid double tap to the glasses 100 (e.g., a pair of taps that is spaced by less than a predefined threshold interval) is detected by a tap input mechanism 319 (FIG. 3) as indicating a charge level display command. The charge level display (as shown in FIG. 2C) can be selectively removed by the user via application of a similar double-tap input. Double-tap inputs can thus be used to toggle charge level display. Instead, or in addiction, the mode indicator 161 can in some embodiments revert to a dormant mode after a predefined display period subsequent to triggering of the charge level display via the tap input mechanism 319.

Figure 3:
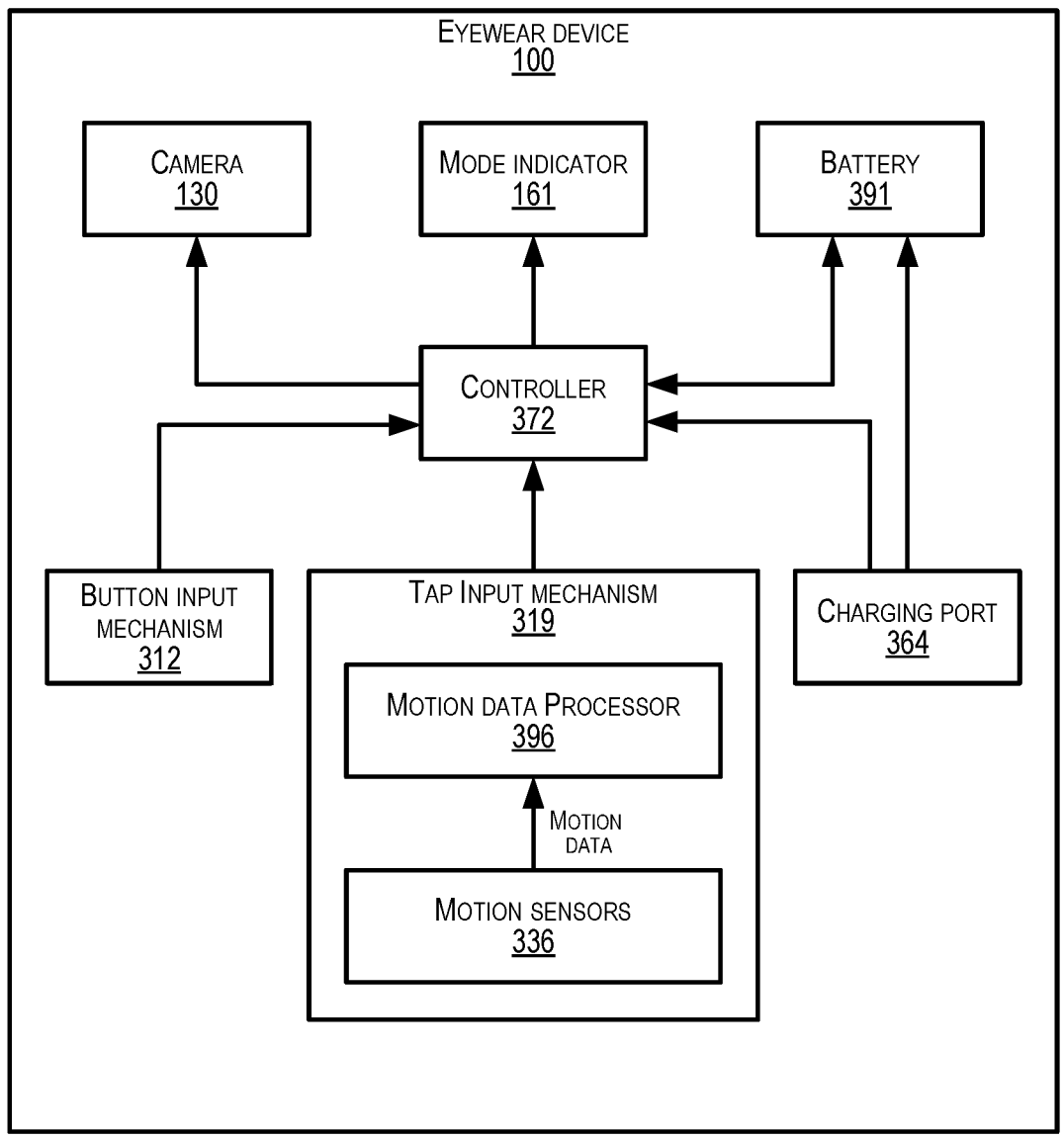
FIG. 3 is a schematic diagram of an eyewear device according to an example embodiment.

The second method of triggering charge level display comprises automatic display of charge level indication by the mode indicator 161 when the glasses 100 are connected to an external charging device for charging of its onboard battery 391 in FIG. 3). Thus, when a charging port 364 (see FIG. 3) incorporated in the eyewear frame 106 is coupled to a charging cable connected to an external power source, such as mains power, the mode indicator automatically switches to charge level indication. Similarly, when the glasses 100 is docked in a complementary carry case with native charging functionality, engagement of the charging port 364 on the glasses 100 with a complementary docking formation in the case automatically causes display of the charge level indication by the mode indicator 161 of the glasses 100.

Figure 4A:
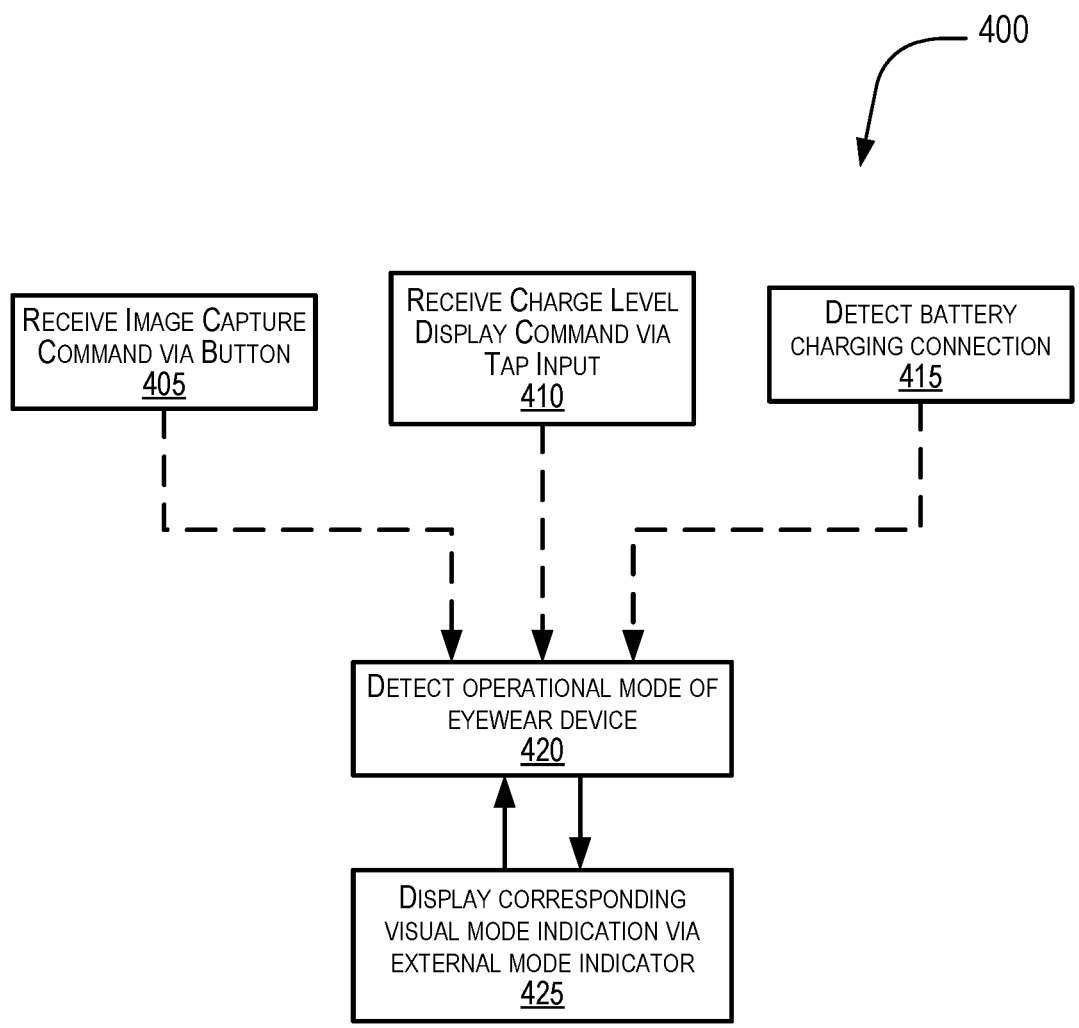
FIG. 4A is a schematic flowchart of a method of operating a camera-enabled eyewear device, according to an example embodiment.

Turning now to FIG. 3, therein is shown a schematic diagram of an eyewear device 100 in the example form of the pair of smart glasses described with reference to FIGS. 1-2, the diagram showing selected components involved with provision of the functionalities described previously with reference to FIGS. 1 and 2, and further described below with reference to FIG. 4.

As shown in the diagram of FIG. 3, the eyewear device 100 includes a controller 372 forming part of the onboard electronics 124 incorporated in the frame 106 of the device (see, e.g., FIG. 1). The controller 372 in this example forms part of an onboard computing device and comprises circuitry configured to control automated operation of various components of the eyewear device, including the previously described onboard camera 130, mode indicator 161, and onboard battery 391. In some embodiments, the circuitry of the controller 372 may be provided by permanently configured circuitry (e.g., in the form of an application specific integrated circuit). In other embodiments, the circuitry of the controller 372 may comprise dynamically reconfigurable circuitry provided by a processor executing machine-readable instructions for performing the various automated operations. Thus, during execution of particular instructions, the processor provides circuitry configured to perform corresponding operations.

The eyewear device 100 includes a button input mechanism 312 that is activatable by pressing of the button 173 (FIG. 1). The button input mechanism 312 is communicatively coupled to the controller 372 to communicate user commands received by button input mechanism 312, e.g. to trigger video capture or photo capture. The controller 372 is in turn connected to the camera 130 to control camera operation responsive to reception of such commands.

The eyewear device 100 further includes a tap input mechanism 319 to receive and interpret user commands communicated to the device by manual or physical taps imparted to the eyewear frame 106. To this end, the tap input mechanism 319 includes an array of motion sensors 336 comprising accelerometers arranged to detect multidirectional acceleration of the eyewear frame 106 indicative of a user's tapping the frame 106.

The tap input mechanism 319 further includes a motion data processor 396 configured to process motion data captured by the motion sensors 336 to distinguish, based on predefined identification criteria, between frame movement resulting from user taps and frame movement resulting from incidental or non-semantic frame movement. Similarly to that described previously with reference to the controller, the motion data processor 396 comprises circuitry configured to perform these operations, the circuitry in some embodiments being provided by a dynamically reconfigurable processor, and in other embodiments being provided by permanently configured circuitry. Note that, in some embodiments, the functionalities of the motion data processor 396 can be incorporated in the controller 372, in which case a motion data processor consistent with this description is provided by the controller 372.

Identification criteria for recognizing tap commands in this embodiment provides for identifying two successive tap motions experienced by the frame, determining an interval between the detected motions, and identifying reception of a charge level display command only if the interval between the taps is smaller than a predefined threshold period. One method of operation of the motion data processor 396 is described below with reference to FIG. 4B. The tap input mechanism 319 is conductively coupled to the controller 372 to communicate reception of user inputs via the tap command channel.

As previously described, the eyewear device 100 further includes a charging port 364 that is electrically coupled to the onboard battery 391. The charging port 364 is configured for coupling to an external connector to allow charging of the onboard battery 391 via an external power supply. The charging port 364 is communicatively coupled to the controller 372 to communicate to the controller 372 a connection status of the charging port 364. The controller 372 is further communicatively coupled to the onboard battery 391 to receive information on a charging status and/or a charge level of the battery 391.

Finally, the controller 372 is in communication with the mode indicator 161 to control display of different visual indications by the mode indicator 161 corresponding to the relevant current operational mode or status of the various components of the eyewear device 100.

FIG. 4 shows a flowchart 400 of an example method of operating the eyewear device 100 according to an example embodiment. In this example embodiment, the flowchart 400 illustrates operations performed by the controller 372 corresponding to the example embodiment of FIG. 3.

At operation 420, the controller 372 detects a current operational mode of the eyewear device 100. In some instances, the operational mode of the eyewear device 100 is triggered by user input or an external event. For example, an image-capture command may be received by the button input mechanism 312, at operation 405. As described previously, such an image-capture command can be a video capture command communicated by a press-and-hold operation. Upon resultant initiation of video capture by the camera 130, the controller 372 detects that the eyewear device 100 is in a video capture mode. In other instances, the image-capture command can be a photo capture command communicated via a short press of the button 173. Responsive to reception of such a photo capture command, the detected operational mode is a photo capture mode.

User input can in some instances include reception of a user command via tap input, at operation 410, to display a charge level of the onboard battery 391. In response to such a command, the eyewear device 100 is disposed to a charge level display mode. Operational mode of the eyewear device 100 can also be determined by a connection status of the charging port 364. For example, detection, at operation 415, of the establishment of a charging connection via the charging port 364 disposes the eyewear device to a battery charging mode.

Note that the example events of FIG. 4 that trigger changes in operational mode are non-exhaustive, and that many additional operational modes are contemplated for which corresponding visual indications are to be provided by the mode indicator 161. Examples include, but are not limited, to device pairing mode, system crashes, system reset, and error modes.

Responsive to detection of the current operational mode of the eyewear device, at operation 420, the controller 372 causes display of a corresponding visual mode indication via the mode indicator 161. As will be evident from the preceding description (e.g., the example modes described with reference to FIGS. 2A-2C) each of a plurality of predefined operational modes of the device 100 and/or the camera 130 has a corresponding unique visual indication pattern and/or animation performable via the mode indicator 161. Detection of operational mode is substantially continuous, so that a particular mode indication is displayed only during persistence of the corresponding operational mode. The relevant mode indication is thus displayed by the mode indicator 161 only during operation of the eyewear device 100 in the corresponding operational mode. For example, when a video capture event is completed, the animated circulation of illuminated LEDs 207 in the indicator 161 (FIG. 2A) ceases and the indicator is returned to a dormant mode in which all of the LEDs 207 are off.

Figure 4B:
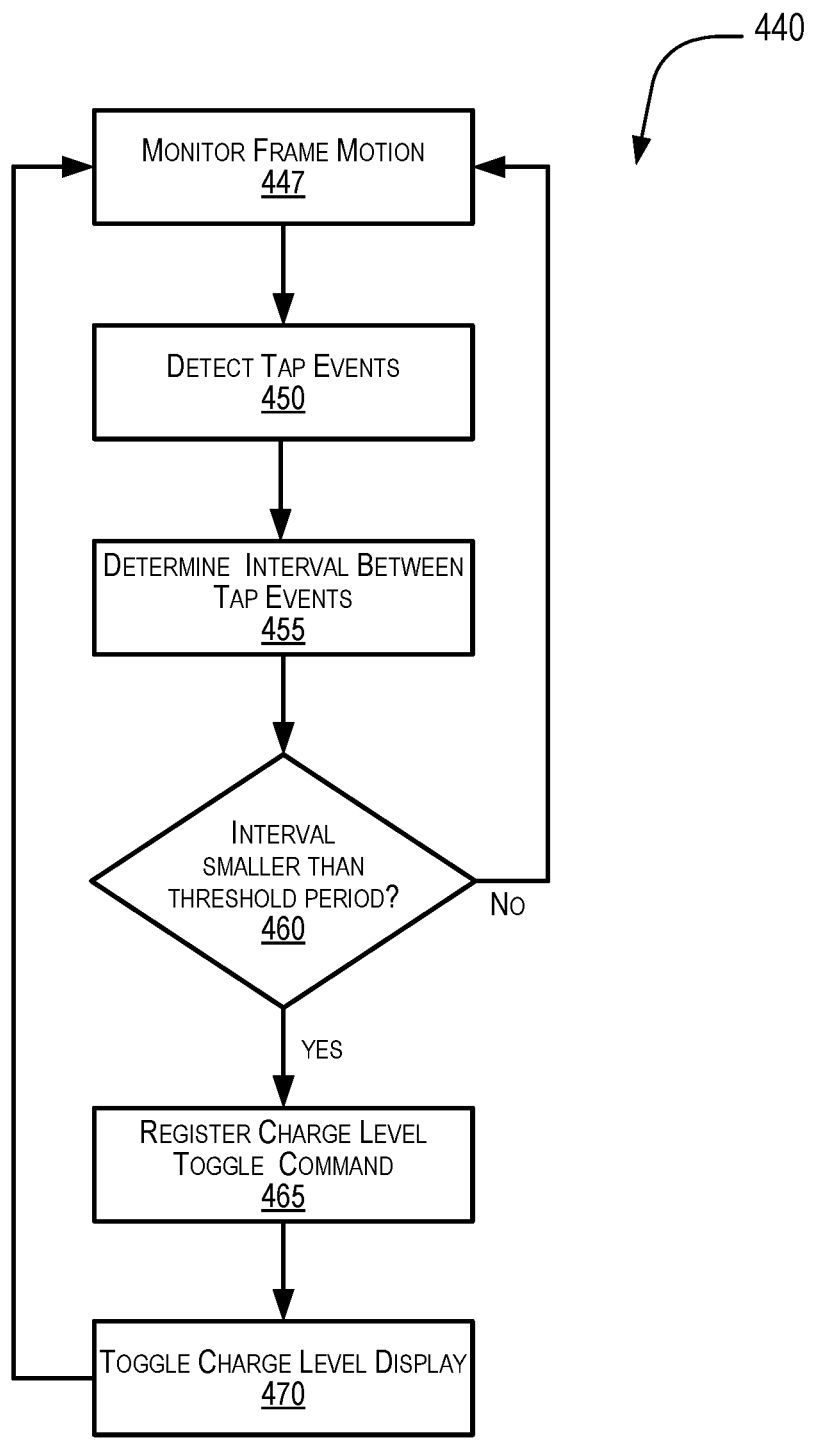
FIG. 4B is a schematic flowchart of a method of processing the motion data captured by one or more accelerometers incorporated in an eyewear device according to the example embodiment of FIG. 1, to identify a user command inputted via a tap command channel.

FIG. 4B shows a flowchart 440 of an example method of operation of the tap input mechanism 319 according to the example embodiment of FIGS. 1-4A. At operation 447, motion of the frame 106 is continuously monitored by the motion sensors 336 incorporated in the frame. Motion data captured by the motion sensors 336 is continuously analyzed by the motion data processor 396. Tap events experienced by the frame 106 are detected, at operation 450, by the motion data processor 396 based on predefined criteria and/or based on a signature tap profile to which events represented in the motion data are compared.

For each pair of detected tap events, an interval between the tap events is determined, at operation 455. At operation 460, the motion data processor 396 establishes whether or not the interval between the sequential tap events is smaller than a predefined threshold period. In this example embodiment, the threshold period is one second. It will be appreciated that different threshold periods can be used in different embodiments, although typical values are expected to be between 0.5 and 1 s. Note that, in this example embodiment, there is no lower threshold period below which a pair of tap events are disqualified or filtered from being recognized as representing a user double-tap. This is because the tap input channel provides only the double-tap command. There is therefore no danger of the user inadvertently inputting a double-tap command when instead intending to single tap. Moreover, a double-tap motion to an end-piece 121 of the eyewear frame 106 (FIG. 1) is less likely to be inadvertently applied than is the case with, for example, an accidental double-click of a table-top mouse. Thus, when it is determined, at operation 460, that the interval is smaller than the predefined threshold period, the pair of tap events reflected in the motion data is registered, at operation 465, as a toggle command for charge level display via the mode indicator 161, responsive to which the charge level display via the mode indicator 161 is doubled, as described previously, at operation 470.

It is a benefit of the tap input command channel provided in parallel with another untethered command channel (e.g., the button command channel in the described example embodiment) that it provides user-friendly and intuitive user interface with an eyewear device. In particular, the secondary command channel using tap inputs provides for augmentation or amplification of manually communicated user inputs without interfering with or complicating user control of camera functions via the primary input channel provided by button presses. In addition, no additional external features or spatially expensive components are necessary to provide the tap input channel.

Example Machine and Hardware Components

The example eyewear device described above may incorporate various computer components or machine elements, at least some of which are configured for performing automated operations and/or for automatically providing various functionalities. These include, for example, mode indication functionalities provided by the mode indicator 161, the controller 372, and/or the motion data processor of the example glasses 100. As discussed previously, the glasses 100 may provide an independent computer system. Instead, or in addition, the glasses 100 may form part of a distributed system including on ore more off-board processors and/or devices. It is to be understood that the description of example hardware and software architecture and components applies to some embodiments of electronics-enabled eyewear devices in isolation, to off-board components co-operating with such eyewear devices, or to such an eyewear device and supporting off-board components in combination, as the case may be.

Figure 5:
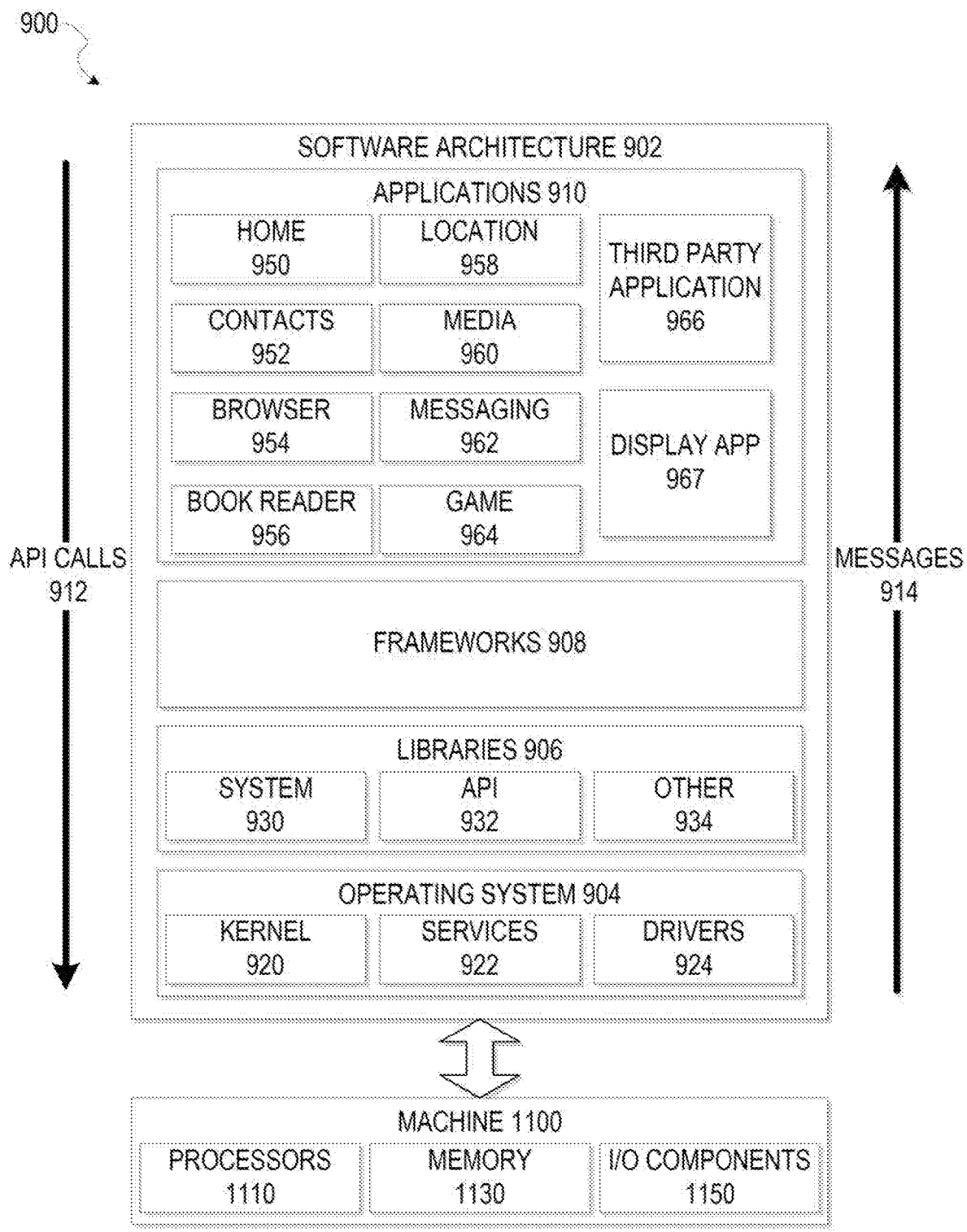
FIG. 5 is a block diagram illustrating an example of a software architecture that may be installed on a machine, according to some example embodiments.

FIG. 5 is a block diagram 900 illustrating an architecture of software 902, which can be installed on any one or more of the devices described above. FIG. 5 is merely a non-limiting example of a software architecture, and it will be appreciated that many other architectures can be implemented to facilitate the functionality described herein. In various embodiments, the software 902 is implemented by hardware such as machine 1100 of FIG. 6 that includes processors 1110, memory 1130, and I/O components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device (e.g. the example eyewear device 100), server computer of a server system, or any other device described or referenced herein may operate using elements of software 902. Devices such as the controller 372 and the tap input mechanism 319, as described earlier, may additionally be implemented using aspects of software 902.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the display mechanism 104 of smart glasses 100, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Embodiments described herein may particularly interact with a display application 967. Such an application 967 may interact with I/O components 1150 to establish various wireless connections with devices such as the controller 372 to control display of visual indications via the mode indicator 161. Display application 967 may communicate with the mode indicator 161 to automatically control display of computer-generated information via display mechanism 104.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module," should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. These considerations, and those that follow, applies equally to hardware modules and to electronic or logic processing and/or control components, controllers, engines, information processing mechanisms, and the like.

Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules.

Moreover, the one or more processors may also operate to support performance of the relevant operations in a "cloud computing" environment or as a "software as a service"

(SaaS). For example, at least some of the operations may be performed by a group of computers (as examples of machines including processors), with these operations being accessible via a network (e.g., the Internet) and via one or more appropriate interfaces (e.g., an Application Program Interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 6:
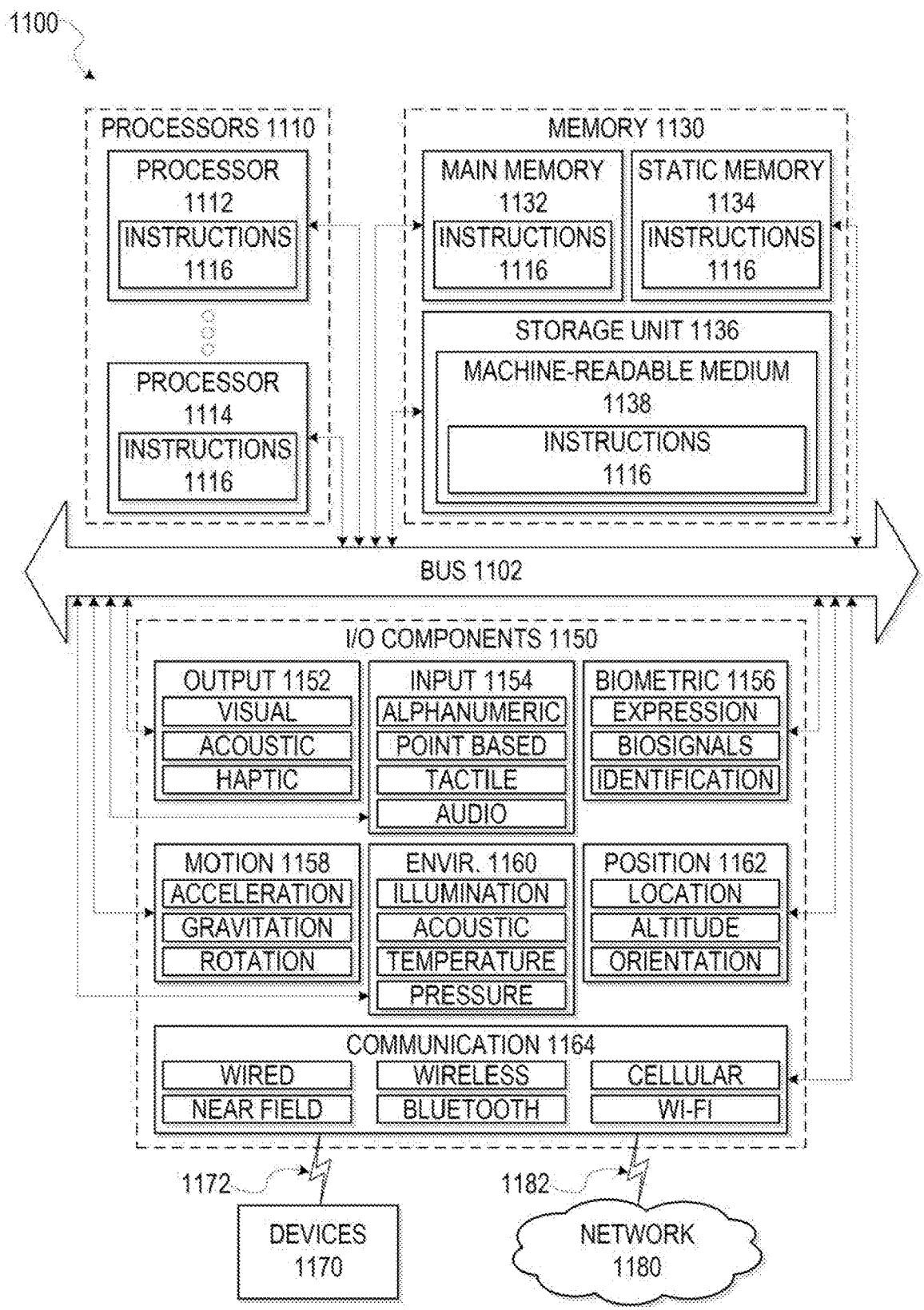
FIG. 6 illustrates a diagrammatic representation of a machine in the form of a computer system within which a set of instructions may be executed for causing the machine to perform any one or more of the methodologies discussed herein, according to an example embodiment.

FIG. 6 is a block diagram illustrating components of a machine 1100, according to some embodiments, able to read instructions from a machine-readable medium (e.g., a machine-readable storage medium) and perform any one or more of the methodologies discussed herein. Specifically, FIG. 6 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 6 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 6. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement, the medium 1138 should be considered as being transportable from one physical location to another. Additionally, since the machine-readable medium 1138 is tangible, the medium 1138 may be considered to be a machine-readable device.

What is claimed is:

1. An eyewear device comprising:
a device body configured for wearing by a user;
on-board electronics incorporated in the device body; and
a tap input mechanism that provides user-access to one or more tap commands receivable via the tap input mechanism, the one or more tap commands including a double tap command and excluding any command triggerable by receipt of a single tap event, the tap input mechanism comprising:
 a motion sensor that is incorporated in the device body and that is configured to sense motion of the device body, and to generate therefrom motion data; and
 one or more processor devices configured to process the motion data to identify therefrom a tap command communicated from the user to the eyewear device by imparting tap motion to the device body, the one or more processor devices being configured to distinguish, based on predefined identification criteria, between respective instances of the one or more tap commands and incidental motion reflected in the motion data, wherein the identification criteria define a tap sequence that indicates receipt of a double-tap command included in the one or more tap commands, the one or more processor devices being configured to identify an instance of the double-tap command by operations comprising:
  identifying two sequential tap events reflected in the motion data;
  determining an interval between the two sequential tap events; and
  registering the two sequential tap events as receipt of the double-tap command in response to and conditional upon the interval being smaller than a predefined threshold.

2. The eyewear device of claim 1, wherein the one or more processor devices are further configured to identify tap events in the motion data based on a predefined signature profile to which events in the motion data are compared.

3. The eyewear device of claim 1, wherein the identification criteria does not include a lower threshold that excludes from identification as an instance of the double-tap command two sequential tap events separated by an interval smaller than the lower threshold.

4. The eyewear device of claim 1, wherein the one or more tap commands receivable via the tap input mechanism is limited exclusively to the double-tap command.

5. The eyewear device of claim 4, wherein the double-tap command is a toggle command that serves to switch a specific device function between two different modes.

6. The eyewear device of claim 5, wherein the toggle command serves to toggle a visual charge level indicator incorporated in the eyewear device between an on mode and an off mode.

7. The eyewear device of claim 1, wherein the one or more tap commands comprise a plurality of tap commands, each of which is associated with a different respective tap sequence defined by the identification criteria.

8. The eyewear device of claim 7, wherein the one or more tap commands include a triple-tap command indicated by three successive tap events reflected in the motion data, the double-tap command and the triple tap command serving to control different respective functions of the eyewear device.

9. The eyewear device of claim 1, wherein the predefined threshold is 0.5-1 s in duration.

10. The eyewear device of claim 1, wherein the predefined threshold is about is in duration.

11. The eyewear device of claim 1, wherein the double-tap command triggers display of a charge level indication by a visual indicator incorporated the device body, the charge level indication showing a level of charge of an onboard battery of the eyewear device.

12. The eyewear device of claim 11, wherein the visual indicator comprises a series of light emitters mounted on an exterior surface of the device body.

13. The eyewear device of claim 11, eyewear device comprises, in addition to a tap command channel provided by the tap input mechanism, a primary input mechanism incorporated in the device body and configured to provide a primary command channel to receive user input for controlling one or more functionalities of the on-board electronics during untethered wear of the eyewear device.

14. The eyewear device of claim 13, wherein the primary input mechanism is provided by a press-button mechanism comprising a button mounted on the device body for manual user operation.

15. A method comprising:
during wear of an eyewear device by a user, receiving user input via a tap input mechanism that provides user access to one or more tap commands that include a double tap command and that does not include any command triggerable by receipt of a single tap event, the tap input mechanism comprising a motion sensing array that is incorporated in a device body and that is configured to generate motion data from detected motion of the device body;
using processing circuitry incorporated in the eyewear device, processing the motion data to distinguish, based on predefined identification criteria, between respective instances of the one or more tap commands and incidental motion reflected in the motion data, wherein the identification criteria define a tap sequence that indicates receipt of a double-tap command included in the one or more tap commands, the processing being performed by operations comprising:
 identifying two sequential tap events reflected in the motion data;
 determining an interval between the two sequential tap events; and
 registering the two sequential tap events as an instance of the double-tap command in response to and conditional upon the interval being smaller than a predefined threshold indicated by the identification criteria; and
in response to registering the double-tap command, using on-board electronics incorporated in the device body, executing a device function associated with the double-tap command.

16. The method of claim 15, wherein the identifying of the two sequential tap events is based on a predefined signature profile to which events in the motion data are compared.

17. The method of claim 15, wherein the one or more tap commands receivable via the tap input mechanism is limited exclusively to the double-tap command.

18. The method of claim 15, wherein the double-tap command is a toggle command that serves to switch a specific device function between two different modes.

19. The method of claim 18, wherein the toggle command serves to toggle a visual charge level indicator incorporated in the eyewear device between an on mode and an off mode.

* * * * *